(12) United States Patent
Hartwig et al.

(10) Patent No.: US 8,713,794 B2
(45) Date of Patent: May 6, 2014

(54) METHOD FOR PRODUCING STEAM GENERATOR TUBE WALLS CONSISTING PRIMARILY OF 9-12% MARTENSITIC CHROMIUM STEELS

(75) Inventors: Ruben Hartwig, Esslingen (DE); Andreas Helmrich, Remshalden (DE); Daniel Mutter, Stuttgart (DE); Alois Schalk, Weinberg-Aurach (DE)

(73) Assignee: Alstom Technology Ltd., Baden (CH)

( * ) Notice: Subject to any disclaimer, the term of this patent is extended or adjusted under 35 U.S.C. 154(b) by 993 days.

(21) Appl. No.: 12/462,483

(22) Filed: Aug. 4, 2009

(65) Prior Publication Data

US 2010/0031506 A1      Feb. 11, 2010

(30) Foreign Application Priority Data

Aug. 8, 2008   (DE) .......................... 10 2008 037 085

(51) Int. Cl.
*F28D 1/047*   (2006.01)

(52) U.S. Cl.
USPC .................... 29/890; 29/890.038; 29/890.046

(58) Field of Classification Search
USPC ............... 29/890, 890.03, 890.038, 890.045, 29/890.046
See application file for complete search history.

(56) References Cited

U.S. PATENT DOCUMENTS

| | | | | |
|---|---|---|---|---|
| 5,725,047 | A * | 3/1998 | Lopez | 165/149 |
| 6,210,806 | B1 | 4/2001 | Hidaka et al. | |
| 2001/0037877 | A1 * | 11/2001 | Poloni et al. | 165/133 |
| 2003/0192680 | A1 * | 10/2003 | Blanda et al. | 165/134.1 |
| 2006/0201587 | A1 | 9/2006 | Amaya et al. | |
| 2008/0011464 | A1 * | 1/2008 | Oofune et al. | 165/157 |
| 2008/0318078 | A1 * | 12/2008 | Matsubara et al. | 428/615 |
| 2009/0252660 | A1 * | 10/2009 | Olver et al. | 422/197 |

FOREIGN PATENT DOCUMENTS

| | | |
|---|---|---|
| GB | 1110439 | 4/1968 |
| JP | 2000-282144 | 10/2000 |

OTHER PUBLICATIONS

Office Action of the Chinese Patent Office for Application 200910160334.4 dated Jan. 31, 2013.

* cited by examiner

*Primary Examiner* — David Bryant
*Assistant Examiner* — Christopher Besler
(74) *Attorney, Agent, or Firm* — Buchanan Ingersoll & Rooney PC

(57) ABSTRACT

A method for producing steam generator tube walls, where the tube walls are formed from a tube-fin-tube combination and are comprised of a multiplicity of at least one of the tube wall components made of plane tube wall panels, curved tube wall panels, transition tube wall panels and corner bends and are configured with a take-up member with one penetration opening each at tube wall regions at which tubes are passed through the tube wall and the tube wall panels exhibit at the periphery longitudinal fin-fin panel joints and transverse circumferential weld-panel joints. The method including producing tube wall components made primarily of 9-12% martensitic chromium steels by welding in a workshop, the components having a material that is not to be heat treated at specific locations. Tempering the tube wall components in the workshop with a first heating device. Connecting the tube wall components at their circumferential weld-panel joints at the assembly site with weld seams. Tempering the weld seams at the assembly site with second heating devices. Connecting the tube wall components at their fin-fin panel joints at the assembly site with weld seams without subsequent tempering of these weld seams. Passing the prepared tubes through the take-up members of the tube walls and connecting the pipe with the take-up members at the assembly site with a weld seam without subsequent tempering of these weld seams.

32 Claims, 12 Drawing Sheets

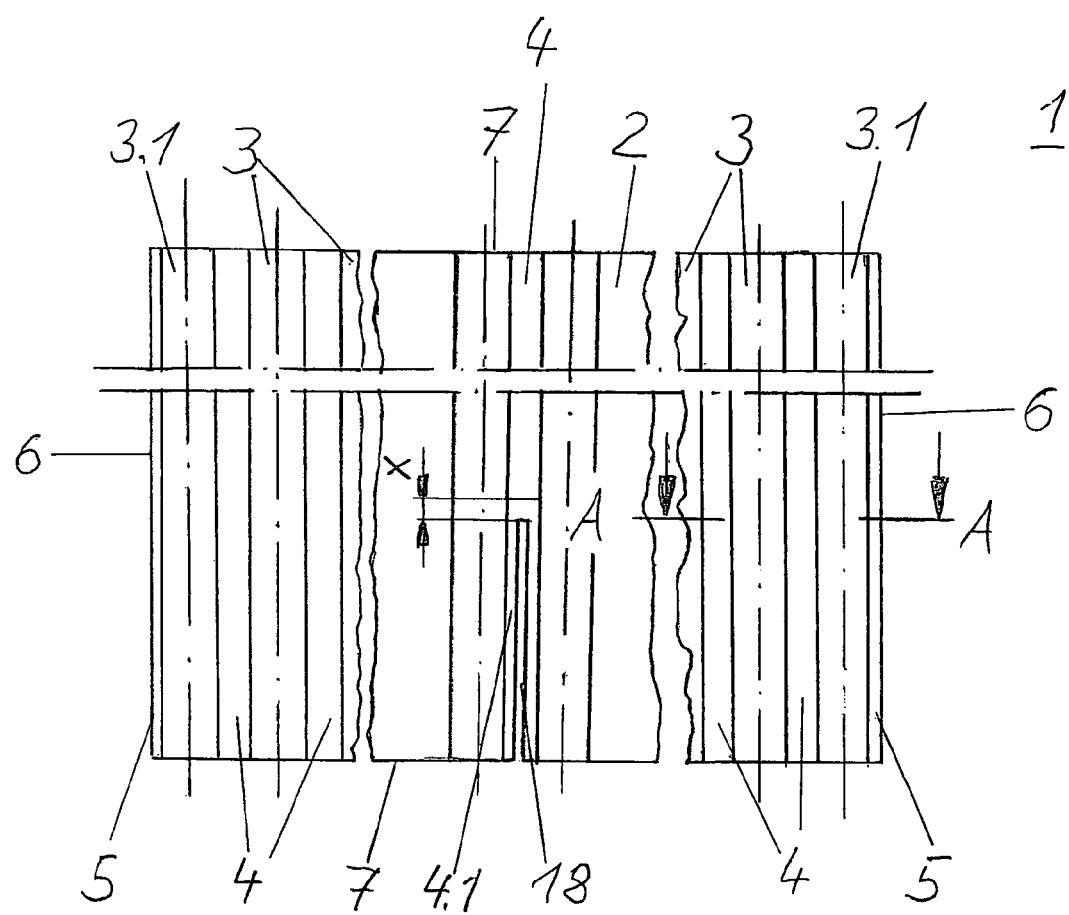

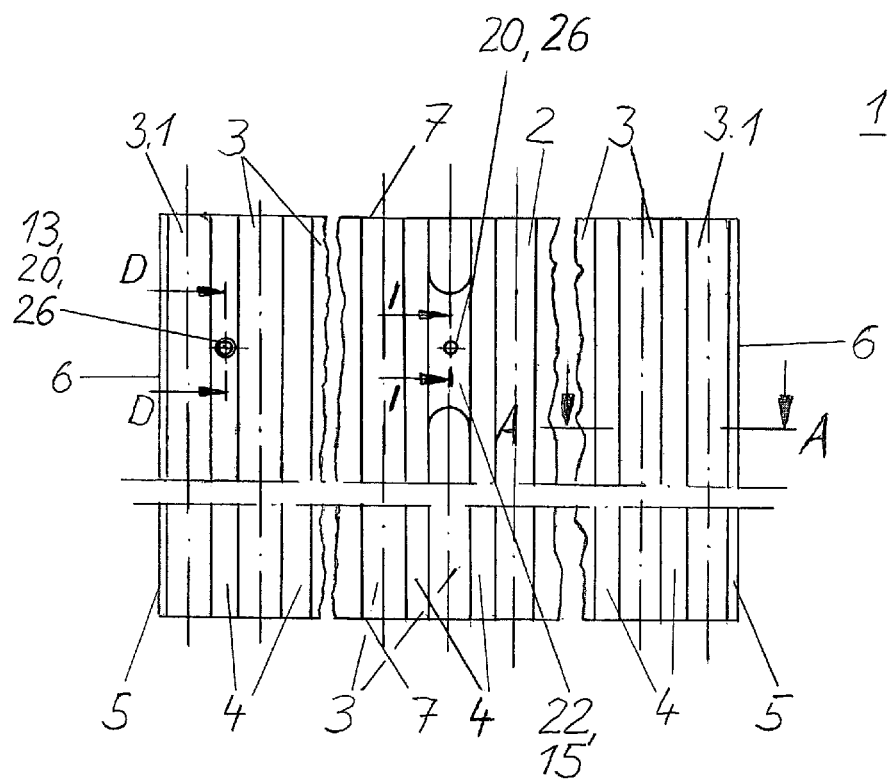
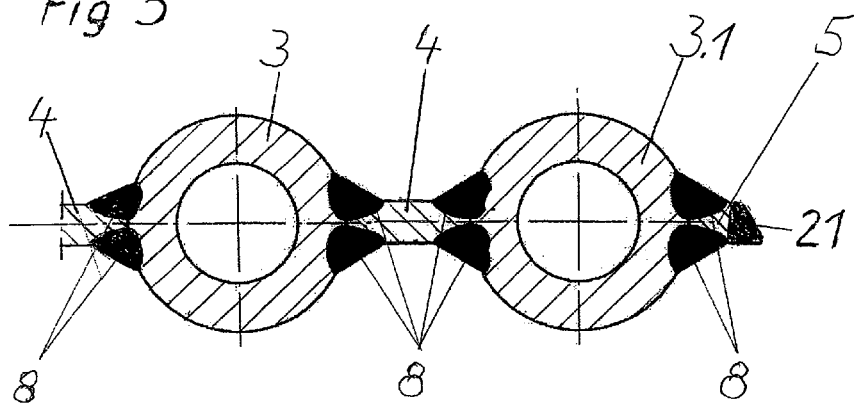

METHOD FOR PRODUCING STEAM GENERATOR TUBE WALLS CONSISTING PRIMARILY OF 9-12% MARTENSITIC CHROMIUM STEELS

BACKGROUND

This disclosure relates to a method for producing steam generator tube walls consisting primarily of 9-12% martensitic chromium steels.

Tube walls are primarily used in steam generators of power plants that are heated with fossil fuels. In this regard, the tube walls surround a combustion chamber that is rectangular in most cases, as well as the gas flue which is arranged over it and in which are arranged heating surfaces that as a rule are made of tube coils. The individual tubes of the tube walls, which are formed of a welded tube-fin-tube combination, carry within them a working medium heated by means of the combustion of the fossil fuel and pass it on to further processes. In the case of the known welded tube walls, the materials 16Mo3, 13CrMo4-5 and 7CrMoVTiB10-10 (T24) and the T23 material approved by the ASME (American Society of Mechanical Engineers) are usually used. As a rule, these materials do not require heat treatment after the welding manufacture or processing of the tube walls.

The desire for steam generation with higher efficiencies which, among other things, help to reduce the emission of $CO_2$ into the atmosphere, leads to an increase of the steam parameters of the steam generator as one of a number of measures. To achieve or realize higher steam parameters, i.e., higher pressures and temperatures of the steam working medium, 9-12% martensitic chromium steels such as the material X10CrWMoVNb9-2 (T92) are required as the tube wall material, since the materials used previously no longer meet the higher requirements. In every case, the steels to be used now require a heat treatment after the welding work. During production of the tube walls, extensive welding work is required both in the workshop as well as at the construction site or during assembly. Specifically, these include as they relate to the workshop and the construction site:

Workshop: Production and completion of the tube wall panels including all of the weld-on parts, production of wall openings and bends as well as the production of wall bends and corner bends for the corners of the tube walls inside the inclined winding, production of transition regions from the inclined tubing to the vertical tubing.

Assembly: Welding of the segment and panel joints, pressure part assembly joints at circumferential welds, including all of the necessary filling and sealing welds, joints at slotted fins (assembly slot) and sealing welds on sockets and sleeves in the region of wall penetrations, completion of weld-on parts on the walls.

The task of the present invention is to suggest a method for producing steam generator tube walls consisting primarily of 9-12% martensitic chromium steels, in which the production takes place in a more efficient and practical way. In particular, it is the task of the invention to suggest a method for producing steam generator tube walls consisting primarily of 9-12% martensitic chromium steels in the workshop and at the construction site that is defined by the following boundary conditions:

Minimization of the welding work and heat treatments at the construction site,
Concepts for structurally necessary welds at the construction site without subsequent heat treatment,
Concepts for structurally necessary welds at the construction site using an optimized local heat treatment strategy.

SUMMARY

Through the inventive solution, a method for producing steam generator tube walls consisting primarily of 9-12% martensitic chromium steels is created that has the following advantages:

Efficient and practical feasibility of the production of tube walls consisting primarily of 9-12% martensitic chromium steels,
Raising the steam generator efficiency through realization of higher steam parameters,
Reducing the emission of $CO_2$ into the atmosphere by increasing the steam generator efficiency.

In a useful further embodiment of the invention, the corner bends are implemented as single or double bends. This measure allows a simple adaptation and connection of the corner bends during assembly of same with the tube wall panels of two adjacent tube walls that lie at right angles to each other.

An advantageous further embodiment of the invention provides that in addition to method step a), at least one of the fins of a tube wall panel exhibits, over a partial region of its elongated extent and starting either from one end of the fin or from both ends of the fin, an elongated assembly slot formed in the longitudinal direction of the fin for the compensation of dimensional inaccuracies, and that in the region of the assembly slot the fin made of 9-12% martensitic chromium steel is replaced with a fin made of a material that does not have to be tempered or post-weld heat treated. Through this measure, first, it makes it substantially simpler to easily compensate for structural inaccuracies of the tube pitches at the tube wall panels at the construction site, since the tube pitches of the tube wall panels that are provided with an assembly slot can be very easily fitted, i.e., the tubes of the adjacent tube wall panels, which may not align with each other, can be fitted by using the assembly slot gap so that after being fitted, the tubes are directly opposite each other and align with each other. Second, the existing assembly slots of the fitted tube wall panels can then be welded into place at the assembly site. Through the advantageous use of the fin which is made of a material that is not to be heat treated and which is provided with a slot, a tempering treatment after welding is not necessary. In the case of very narrow fins, however, it can be advantageous to subject the region of the fill welding of the assembly slot with the adjacent tubes to a tempering treatment, since it is not only the fin that is not to be heat treated that is impinged upon by the welding temperatures, but the adjacent tubes that are to be heat treated are impinged upon as well. In another advantageous further embodiment, the length of the fin that is provided with the assembly slot corresponds to the length of the assembly slot, plus an excess amount (X) of 10 to 100 mm. This ensures that the later welding of the assembly slot takes place in the region of the fin made of a material that is not to be heat treated.

It is useful to form individual tubes or all tubes of a tube wall panel on their circumferential weld-panel joint with a tube extension made of a material that is not to be heat treated. This measure means that following the welding at the assembly site of, for example, the assembly slot in the fin closely adjacent to the tube extension, a subsequent tempering treatment does not have to be carried out on the tube extensions. In an advantageous way, the tube extensions are arranged directly adjacent to the assembly slots and possess the length of the fins exhibiting the assembly slots.

In an advantageous embodiment of the invention, the take-up member for taking-up a tube that penetrates the tube wall is configured as a filler plate, whereby the filler plate closes off an opening between two tubes and/or fins and/or half-fins that arises through the bending of at least one tube in the tube wall region with a tube penetration, whereby the filler plate is welded with the tubes and/or with the fins and/or with the half-fins. Another advantageous further embodiment of the invention provides that the take-up member is configured as a sleeve and is arranged either inside a fin or inside two half-fins or inside a filler plate and is welded with same. The sleeve is preferably used when there is sufficient space available inside the fin for mounting and welding the sleeve. As a result, the filling plate is used especially when the penetration of the tube of the tube coil through the tube wall in the region of the fin is difficult for reasons of space or is too narrow. Through this measure, it is possible to achieve a penetration through the tube wall for tubes of tube coils that are arranged inside the steam generator tube walls that is simple to produce from the manufacturing point of view.

In an advantageous further embodiment of the invention, in addition to step d) of the present invention additional heating devices are used in the region adjacent to the region of the welded seams and heating devices located on both sides of the tube wall panels. Through these additional heating devices, auxiliary heat is generated for reducing the temperature gradients that occur during the tempering treatment as well as the stress that results from the temperature differential.

In a useful further embodiment of the invention, when a half-fin made of 9-12% martensitic chromium steel is used with a buffering made of a material that is not to be heat treated, the tube adjacent to the half-fin is also selected from the same material, since this makes good sense from the welding and heat-treatment point of view.

A useful further embodiment of the invention provides that during the tempering treatment, the annealing region of the tube wall panel is relieved of forces by means of force deflection of its own weight by means of a hydraulic or mechanical auxiliary structure. An optimum heat treatment is achieved as a result.

It is advantageous to configure the fins and half-fins at their side surfaces adjacent to the tubes with natural rolled edges of up to 2 mm each. This serves as a basis for the use of welding parameters that are optimized in terms of reduced welding stresses. It is additionally advantageous to form the side surfaces of the fins and half-fins adjacent to the tubes in the region of the circumferential weld-panel joints with a chamfer for a double bevel groove weld. Through this measure, a complete connection, i.e., a weld over the complete wall thickness of the fin, of the tube-fin connection can be achieved in this region, and thus a reduction of the stress concentration.

Another advantageous embodiment of the invention provides that the tempering treatment takes place at a temperature from 740 to 780° C., and in another advantageous further embodiment of the invention, the tempering treatment takes place over a time span of 2 minutes/mm of wall thickness, but for at least 60 minutes. A perfect tempering treatment or annealing of the components to be heat treated is assured in this way.

Another advantageous embodiment of the invention provides that assembly welded connection locations of additional weld-on parts that are made primarily of 9-12% martensitic chromium steel (e.g., weld-on pads) are formed at the workshop with a plating made of a material that is not to be heat treated and/or a forged or rolled semifinished product made from a material that is not to be heat treated and/or from a buffering made of welding material that is not to be heat treated, and the weld-on parts are then welded to the tube wall panel in the workshop and are tempered in a heating device along with the tube wall panel. This measure means that weld-on parts with weld-on surfaces onto which parts can be welded at the construction site, are present on the tube walls without these welded seams having to be heat treated.

BRIEF DESCRIPTION OF THE DRAWINGS

The present disclosure may be better understood and its numerous objects and advantages will become apparent to those skilled in the art by reference to the accompanying drawings in which:

FIG. 3 is a schematic representation of a variation of the plane tube wall panel of FIG. 1, with an assembly slot in the fin;

FIG. 4 is a schematic representation of a variation of the plane tube wall panel of FIG. 1, with sleeve inserted into the tube wall panel or alternatively with an opening in the filler plate for penetration of a tube of a tube coil arranged inside the tube wall;

FIG. 5 is a cross sectional view taken along line A-A of FIG. 1 with buffering on the half-fin;

DETAILED DESCRIPTION

Tube walls 1 produced in accordance with the invention are used primarily in steam generators, not shown, of power plants that are heated with fossil fuels. In that regard, the tube walls 1 surround a combustion chamber that is rectangular or square in most cases, as well as the gas flue which is arranged over it and in which are arranged heating surfaces that as a rule are made of tube coils. This means that as a rule, four side walls as tube walls surround the combustion chamber and/or gas flue of the steam generator. The individual tubes of the tube walls 1, which are formed of a welded tube-fin-tube combination, carry within them a working medium heated by means of the combustion of the fossil fuel and pass it on to further processes. Depending on the construction of the steam generator, the tube walls 1 can be tubed vertically or inclined, or can be formed from a combination of inclined tubing and vertical tubing, i.e., the individual tubes run inclined, i.e., at an angle, or vertically within the tube wall 1. In addition, this means that depending on the construction of the steam generator or the tube wall 1, a different configuration of the tube wall components of plane tube wall panels 2, curved tube wall panels 2.1, transition tube wall panels 2.2 and corner bends 28 can exist. Only in the case of the inclined tubed tube walls 1 the transition tube wall panels 2.2 at the transitions from inclined tubed to vertically tubed tube wall regions are dispensed with, while in the case of only vertically tubed tube walls 1 the tube bends at the corners of the tube walls 1 are additionally dispensed with.

Figure 1:
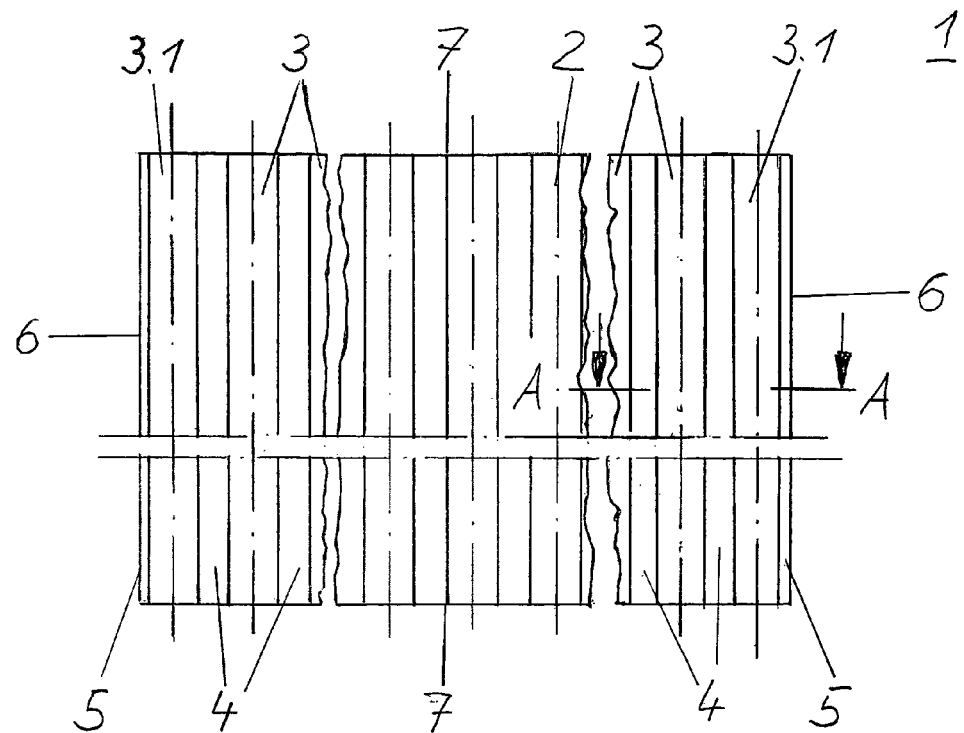
FIG. 1 is a schematic representation of a plane tube wall panel of a steam generator tube wall as a view, whereby the tube wall panel has been produced in the workshop.
Figure 2:
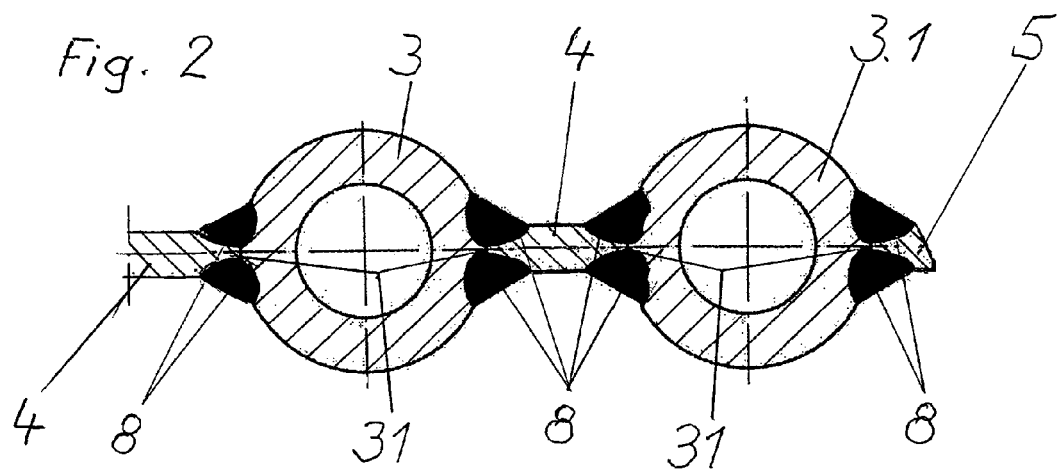
FIG. 2 is a cross sectional view taken along line A-A of FIG. 1.

FIG. 1 shows a plane tube wall panel 2 that was completed in a workshop, whereby a multiplicity of such tube wall panels 2 are needed for producing the tube walls 1 of a steam generator, not shown, in that the tube wall panels 2 are welded together at their fin-fin and circumferential seam-panel joints 6, 7, which form the outer edge of the tube wall panels 2, at the construction site, i.e., during assembly. The plane tube wall panel 2 can be used for both vertically tubed and inclined tubed tube walls 1, and as is shown in FIG. 1, can be configured as a rectangle or else as a trapezoid or as another shape as needed. It is formed of a multiplicity of tubes 3, 3.1, fins 4 arranged between the tubes 3, 3.1, and at the fin-fin panel joints 6 (i.e., the panel joint or outer edge that extends along or parallel to the longitudinal axes of the tubes 3, 3.1) of the tube wall panels 2, each with a half-fin 5. The middle tubes 3 and the fins 4 are made of 9-12% martensitic chromium steels, preferably of the material X10CrWMoVNb9-2 (T92), each of the outermost tubes 3.1 on the two sides of a plane tube wall panel 2 are made of 9-12% martensitic chromium steels or of a material that is not to be heat treated. The half-fins 5 are made of a material that is not to be heat treated or of 9-12% martensitic chromium steel, whereby in the case of the latter material a buffering 21 made of a material that is not to be heat treated is applied to the longitudinal side of the half-fins 5 (see FIG. 5). Thus, according to the invention, the tube wall panels 2 along the fin-fin panel joints 6 are constructed with a material that is not to be heat treated. All of the tubes 3, 3.1, fins 4 and half-fins 5 of a tube wall panel 2 are connected to a tube wall panel 2 by means of welded seams 8 in the workshop, whereby the welded seams 8 can be configured as fillet welds as shown in FIG. 2 or in some other way (double bevel groove welds). To apply the workshop welded seams 8 and the welded seams 9 and 12 that are to be applied later at the assembly site (see FIGS. 9 and 11), to the fin-fin and the circumferential seam panel joints 6, 7, suitable chamfers are provided at the faces of the tubes 3, 3.1, fins 4 and half-fins 5. In the case of the buffering 21 applied by means of buffering welding, for example, according to FIG. 5 the chamfer can be formed along with its application on the longitudinal side of the half-fins 5. Wall openings or bends in the tube wall 1 that may become necessary for burner openings, inspection doors, etc. are taken into account during the production of the individual tube wall panels 2, but are not illustrated in FIG. 1.

What is sought or meant with regard to the employment or use of materials that are not to be heat treated are materials that do not have to be tempered or post-weld heat treated after they have been welded to the components that are to be connected.

With regard to the selection of the materials for the tubes 3.1 and the half-fins 5 of the tube wall panels 2, the method is such that when the half-fins 5 are made of 9-12% martensitic chromium steel, the adjacent tubes 3.1 are preferably made of the same material. When the half-fins 5 are made of a material that is not to be heat treated, the adjacent tubes 3.1 can preferably be made of 9-12% martensitic chromium steel, assuming that the half-fins 5 are wide enough and the effect of the weld seam 8 between half-fin 5 and tube 3.1 turns out to be slight. For the case in which the half-fins 5 are very narrow and thus the effect of the weld seam 8 between half-fin 5 and tube 3.1 turns out to be great, the adjacent tube 3.1 is also preferably made of a material that is not to be heat treated.

Figure 6:
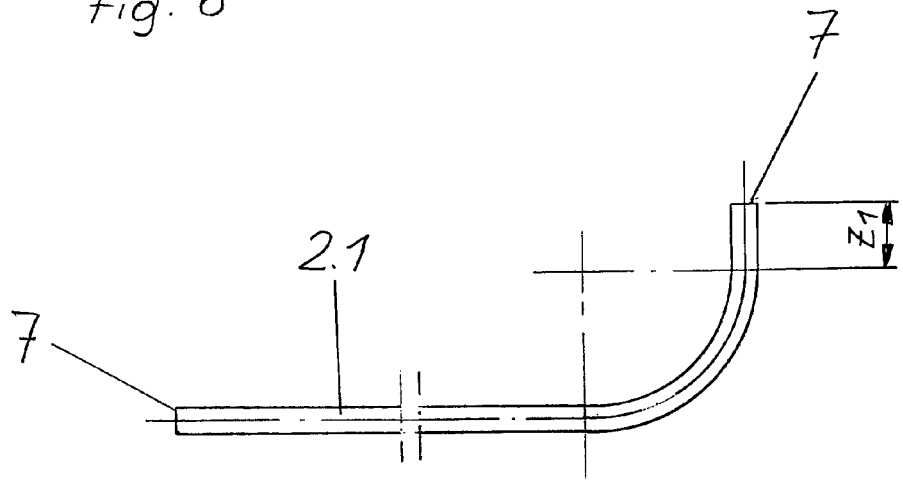
FIG. 6 is a schematic plan view of the end of the tube wall panel of FIG. 1.

For the case in which the steam generator is configured with inclined tubed or vertically tubed tube walls 1, tube wall panels 2.1, the ends of which are curved in accordance with FIG. 6 and thus form a corner of the tube wall 1, are required for the inclined tubed tube walls 1. To produce the tube wall panel 2.1, a plane tube wall panel 2 that has been produced as described above is used, and it is bent at its end by means of suitable bending tools so that the end of the tube wall panel 2.1 is formed into a corner. In conjunction with that, the method is then such that the, tubes 3, 3.1 and the fins 4 and half-fins 5 exhibit at the bend end of the tube wall panel 2.1 at least one short straight region, i.e., a defined leg length Z1, and the tube and fin ends thus do not end in the tube bend. The straight region in the tube outlet simplifies the later connection of the circumferential weld-panel joint 7 at the construction site. The leg length Z1 can be 0.3 to several meters. In addition, with curved tube wall panels 2.1, in addition to half-fins 5 made of a material that is not to be heat treated, the adjacent tubes 3.1 are preferably also made of material that is not to be heat treated. This simplifies the welding work on the fin-fin panel joint 6 at the assembly site.

Figure 7:
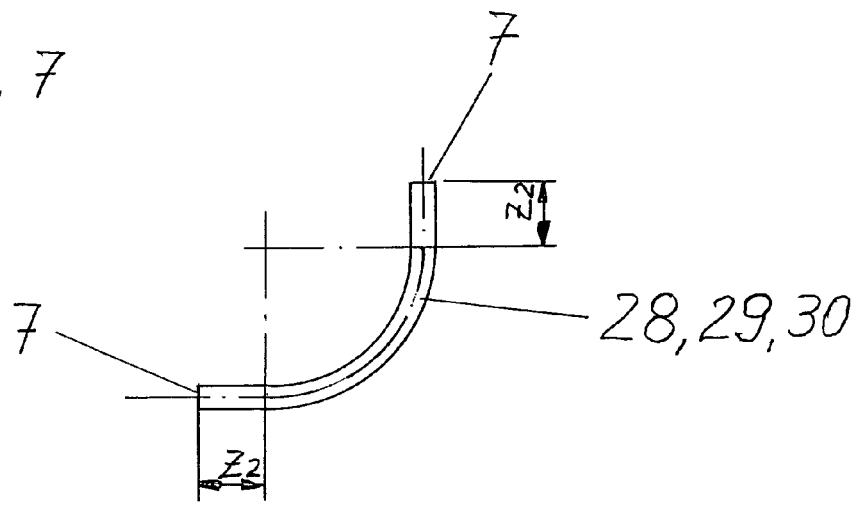
FIG. 7 is a schematic plan view of a corner angle of FIG. 1, showing the corner angle as a connecting part of the plane tube wall panel.

As an alternative to the use of tube wall panels 2.1 that are bent at their ends in order to form the tube walls 1, plane tube wall panels 2 can be used, which in the construction site assembly of the tube walls 1 are connected at the corners of the tube walls 1 with corner bends 28. For that purpose, parallel in time with the tube wall panels 2, corner bends 28 in accordance with FIG. 7 are manufactured in the workshop, preferably individually or as double corner bends, whereby each of the (double) corner bends 28 exhibits a connecting fin 29 for later connection at the assembly site with the adjacent (double) corner bend 28 (corresponding to the connection of tube 3 and fin 4), whereby the connecting fin 29 is connected by means of a welded seam 30 with the (double) corner bend 28. The single or double corner bends 28 and the connecting fin(s) 29 welded to them to form a tube-fin-tube connection are made of a material that is not to be heat treated. This allows a connecting of the tube wall panels 2 with the corner bends 28 and connecting fins 29 at the assembly site by means of welding without subsequent tempering treatment of the corner bends 28 and connecting fins 29. The decision as to whether curved tube wall panels 2.1 or plane tube wall panels 2 are used in conjunction with corner bends 28 must or can be made from commercial and constructional perspectives. While the use of curved tube wall panels 2.1 has proven to be more cost-effective, the use of plane tube wall panels 2 in conjunction with corner bends 28 can record advantages in matters involving compensation of dimensional inaccuracies in the corner region of the tube walls 1. As with the curved panel wall 2.1, the corner bends 28 exhibit at their ends at least a short straight region, i.e., a defined leg length Z2, whereby the leg length Z2 should make up at least one times the diameter of the corner bend tube (between 30-50 mm as a rule).

Figure 8:
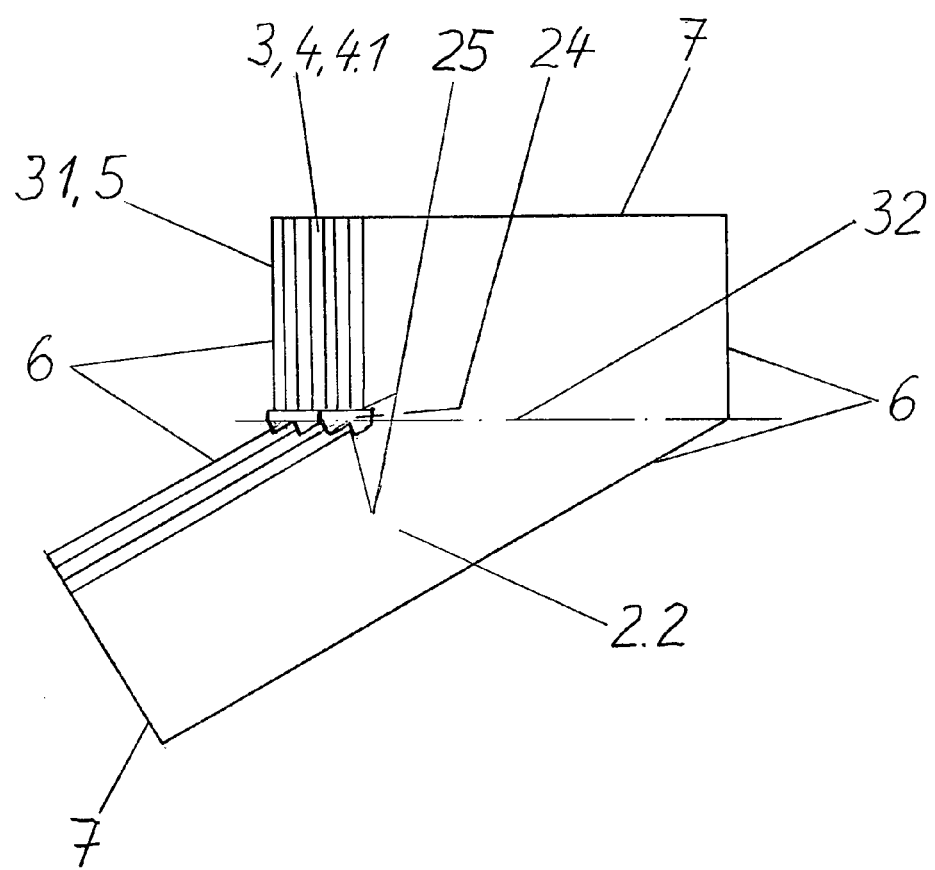
FIG. 8 is a schematic plan view of a variation of the plane tube wall panel of FIG. 1, with the transition piece from the inclined tubed to the vertically tubed tube wall.

In addition, for steam generators with inclined and vertically tubed tube walls 1 transition tube wall panels 2.2 in accordance with FIG. 8 are needed, which effect the transition 32 between the variously tubed tube walls 1. For that purpose, two plane tube wall panels 2 manufactured in accordance with the dimensional requirements, i.e., custom made, are assembled in that the ends of the tubes 3, 3.1, the fins 4 and the half-fins 5 of the two tube wall panels 2 are connected at the transition region 32 by means of fittings 24 and by means of a weld seam 25, whereby the fittings 24 are also welded to each other. As can be seen from FIG. 8, the geometric form of the tube wall panels 2, 2.1, 2.2 is not limited to a rectangular configuration (as shown in FIGS. 1, 3 and 4) but can instead be matched to the structural requirements of the tube wall 1. In addition, the tube pitch of the inclined tubed tube wall 1 can be different when compared with the vertically tubed tube wall 1, so that for example, two tubes 3, 3.1 used in the vertically tubed part of the tube wall 1 come onto one tube 3, 3.1 in the inclined tubed part.

Figure 11:
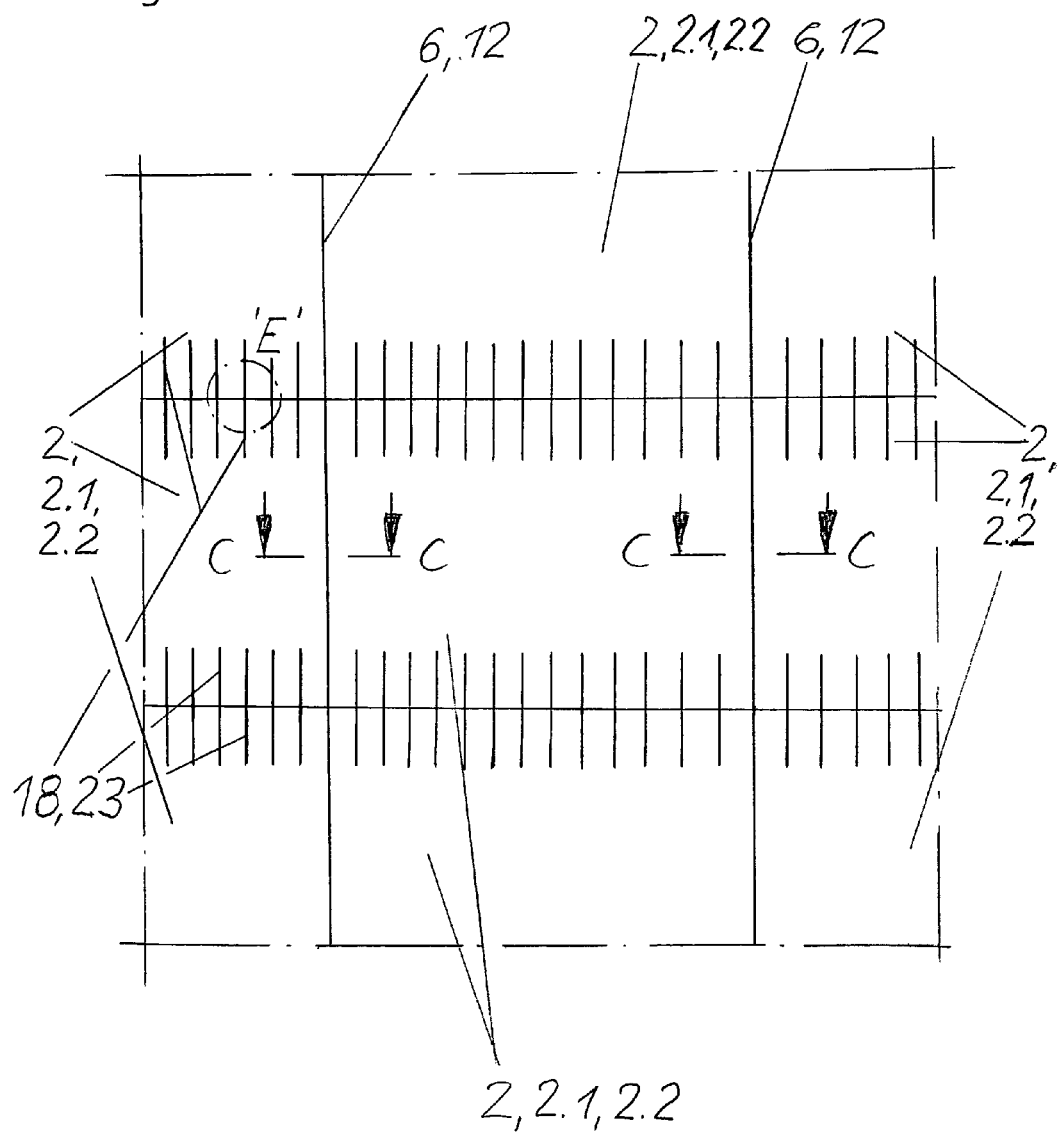
FIG. 11 is a schematic plan view of the assembly-site connection of the tube wall panel to its fin-fin panel joints.

In order to be able to compensate for dimensional inaccuracies with regard to pitch differences at the tube wall panels 2, 2.1, 2.2 during the later assembling or welding of the circumferential weld-panel joints 7 of the tube wall panels 2, 2.1, 2.2 at the assembly site, as well as thermal expansions during the local heat treatment at the construction site, on at least one of the fins 4 of a tube wall panel 2, 2.1, 2.2, an elongated assembly slot 18 of a defined length (e.g., 0.3 to 1.0 m) and defined slot width (e.g., 3 to 6 mm) can be arranged over a partial region of its longitudinal extent and starting from either one end of the fin 4 or from both ends of the fin 4. FIG. 3 shows an assembly slot 18 which starts from only one end of the fin 4, i.e., from one of the two circumferential weld-panel joints 7. In conjunction with that, the fin 4 made of 9-12% martensitic chromium steel is replaced in the region of the assembly slot 18 by a fin 4.1 made of a material that is not to be heat treated, whereby the length of the fin 4.1 can correspond to the length of the assembly slot 18 plus an excess amount X of 10-100 mm. Through the use of the fin 4.1 made of a material that is not to be heat treated, it becomes possible to close or fill the assembly slot 18 following the adaptation and assembly site welding of the tube wall panels 2, 2.1, 2.2 by means of a welded seam 23, without having to heat treat this welded seam 23 afterwards. FIG. 11 shows several welded-together tube wall panels 2, 2.1, 2.2 that are configured with a multiplicity of such assembly slots 18. For example, every third, second or individual fin 4 can be configured with an assembly slot 18 and thus with a fin 4.1. FIG. 11 additionally shows by way of example tube wall panels 2, 2. 1, 2.2 that are configured at both ends of the fins 4 of a particular tube wall panel 2, 2.1, 2.2, i.e., at both circumferential weld-panel joints 7, with assembly slots 18 and thus with fins 4.1.

Figure 12:
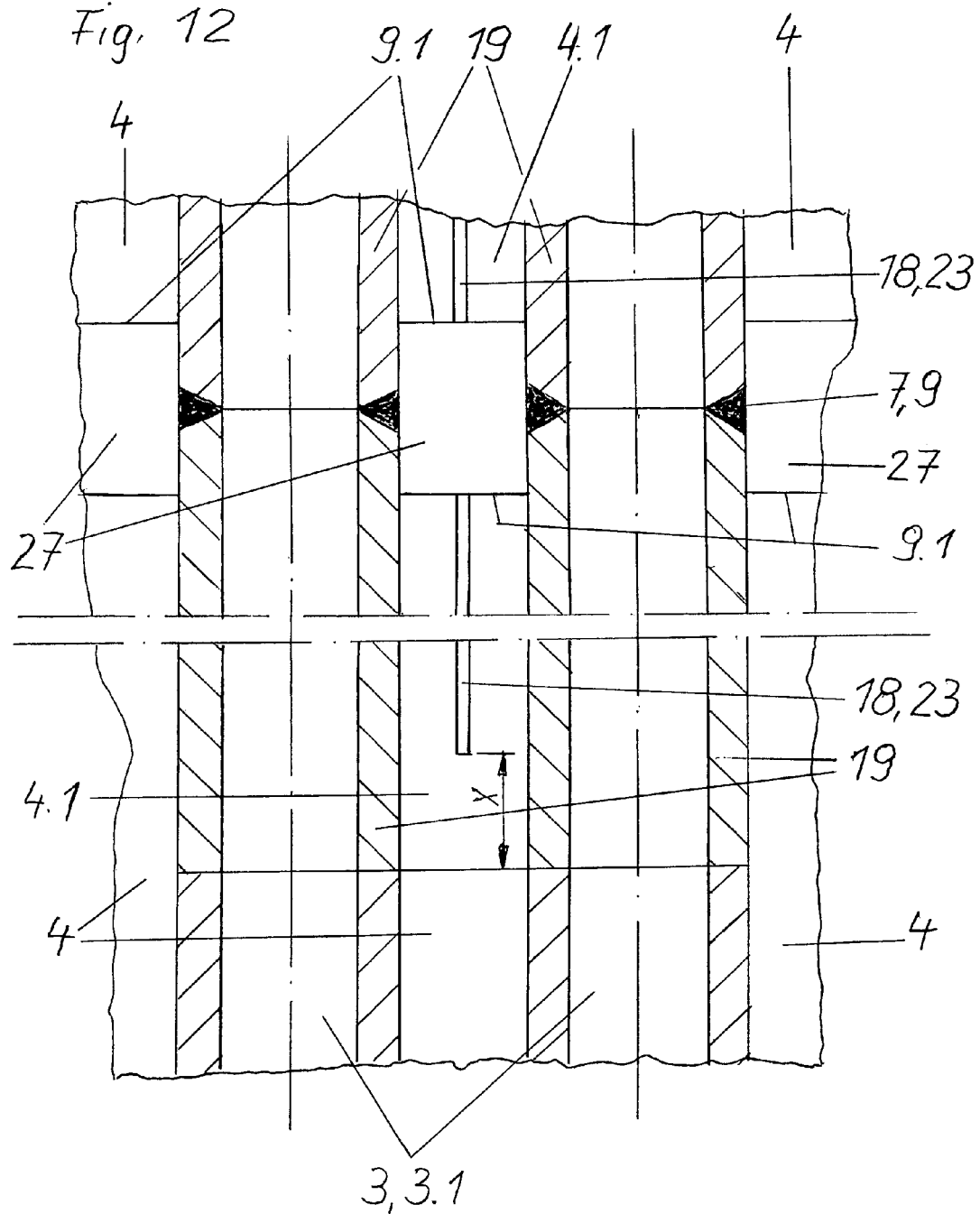
FIG. 12 is detail "E" from FIG. 11 as a longitudinal section.

The later closing of the assembly slots 18 at the assembly site by means of welded seams 23, particularly in the case of narrow fins 4.1, can lead to the tubes 3, 3.1 that are adjacent to the fin 4.1 and made of 9-12% martensitic chromium steel having to be heat treated afterwards. This heat treatment that might become necessary can be avoided in that in the region of the assembly slot 18 or the fin 4.1, the particular adjacent tubes 3, 3.1 in accordance with FIG. 12 are extended with a material that is not to be heat treated. This means that in the region of the assembly slot 18 or the fin 4.1, the ends of the tubes 3, 3.1 made of 9-12% martensitic chromium steel are replaced by tube extensions 19 made of a material that is not to be heat treated. In that regard, the lengths of the tube extensions 19 are preferably adjusted to the lengths of the fins 4.1.

Figure 14:
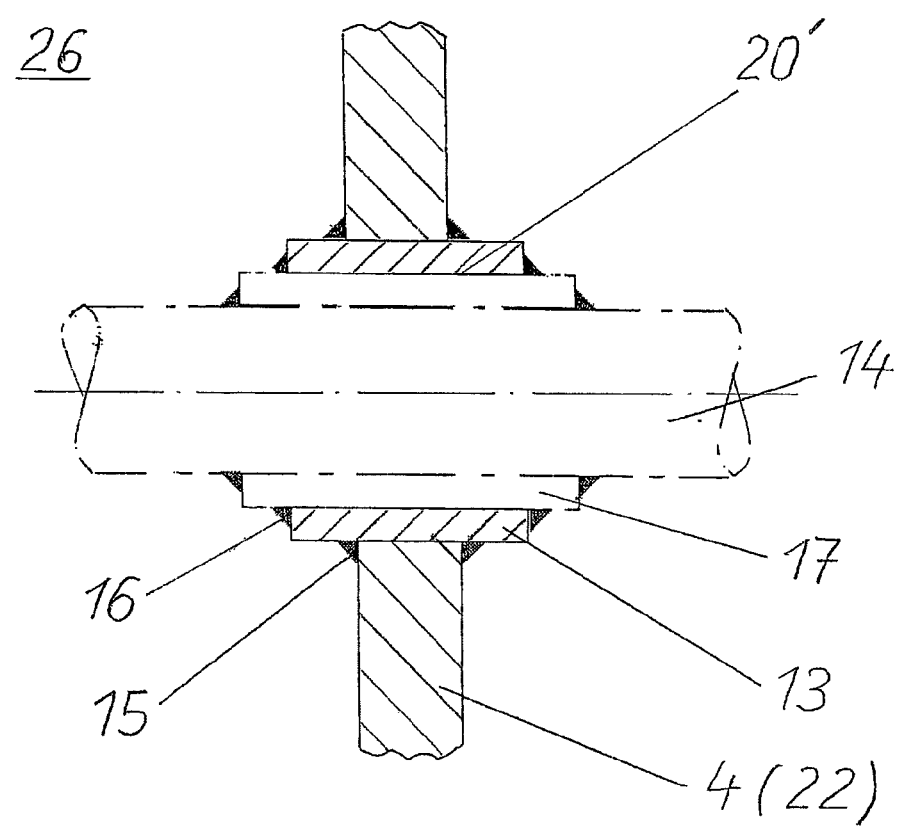
FIG. 14 is a cross sectional view taken along line D-D of FIG. 4.
Figure 15:
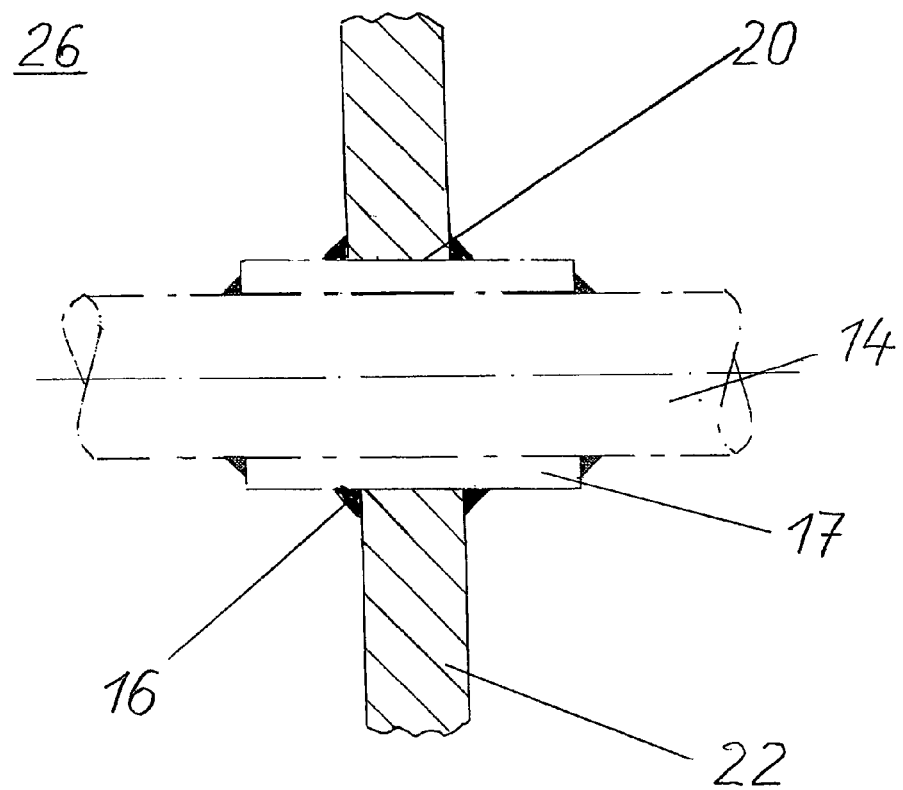
FIG. 15 is a cross sectional view taken along line I-I of FIG. 4.

At the regions 26 of the steam generator tube walls 1 at which tubes 14 from tube coils, not shown, or heating surfaces, which are arranged inside the tube walls 1 in accordance with FIGS. 4, 14 and 15 are passed through or go through the tube wall 1, take-up member, each of which exhibits a penetration opening 20, 20'suitable for penetration of the tube 14 and which is made of a material that is not to be heat treated are provided inside the tube panels 2, 2.1, 2.2 for take-up and passing through the tube 14. A filling plate 22 or a sleeve 13 can serve as a take-up member. As a rule, the sleeve 13 is used when the fin 4 or the two half-fins 5 between the tubes 3, 3.1 is wide enough to receive a sleeve 13 and to be able to weld it in the fin 4 or half-fins 5 by means of a welded seam 15 (see FIG. 14). In those cases in which the fin 4 is too narrow, a tube 3, 3.1 is bent out from the plane of the panel, for example, and the resulting free space is filled with a filler plate 22 and is welded with the adjacent tubes 3, 3.1 and/or fins 4 and/or half-fins 5 by means of a welded seam 15 (see FIGS. 4 and 15). Depending on the geometric arrangement of the regions 26 on the tube walls 1 in which the tubes 14 including their sleeves 17 pass through the tube walls 1, it may be that a tube wall panel 2, 2.1, 2.2 exhibits no, one, or multiple regions 26 with tube penetrations. As a rule, the distances between the tubes 14 that are passed through the tube walls 1 correspond to the multiple of the tube pitch within the tube wall 1, i.e., the tube penetrations turn out to be structurally identical. It is also possible to additionally insert into the filler plate 22 that is provided as a take-up member a sleeve 13 for taking up the tube 14 and to connect them to each other by means of a welded seam 15. See FIG. 14 in this regard, whereby here the sleeve 13 is not arranged in the fin 4, but rather in the filler plate 22 (see 22 in parentheses).

Following the production or completion of the tube wall panels 2, 2.1, 2.2 in the workshop, in the next step in the method, also in the workshop, the welded seams 8, 15, 21 and 25 of all of the tube wall panels 2, 2.1, 2.2 are tempered in a first heating device, not shown. As a rule, used as the first heating device is a furnace adapted on the basis of the dimensions of the tube wall panels 2,2.1,2.2, in which the tube wall panels 2,2.1,2.2 are heat treated individually or in multiples. Provision is thus made in accordance with the invention that a substantial portion of the welded seams that are to be applied to the tube wall panels are already tempered in the workshop, and thus no additional effort is required in this regard at the construction site for the assembly. The list above itemizes all possible tube wall panels and all possible welded seams for heat treatment. As was indicated above, only one form of tube wall panel and its welded seams can be used, depending on the design of the steam generators and thus of the tube walls 1 as well. The tempering treatment of the welded seams 8, 15, 21 and 25 inside the first heating device is advantageously carried out at a temperature of 740° to 780° C., and additionally advantageously over a time span of 2 minutes/mm of wall thickness, but at least for 60 minutes.

Figure 9:
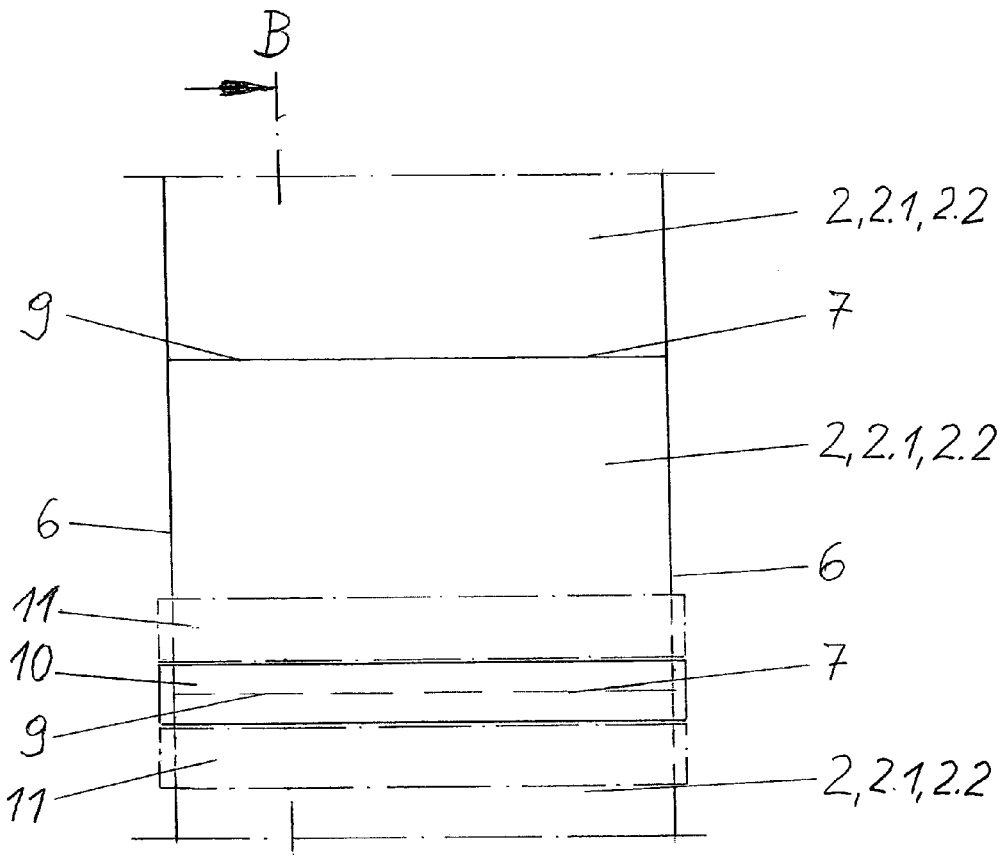
FIG. 9 is a schematic plan view of the assembly-site connection of the tube wall panel at its circumferential seam-panel joints, whereby in the upper part of the Figure the welding of the tube wall panel is illustrated, and in the lower part of the Figure the tempering treatment of the welding seams by means of locally used and locally acting heating devices is illustrated.
Figure 10:
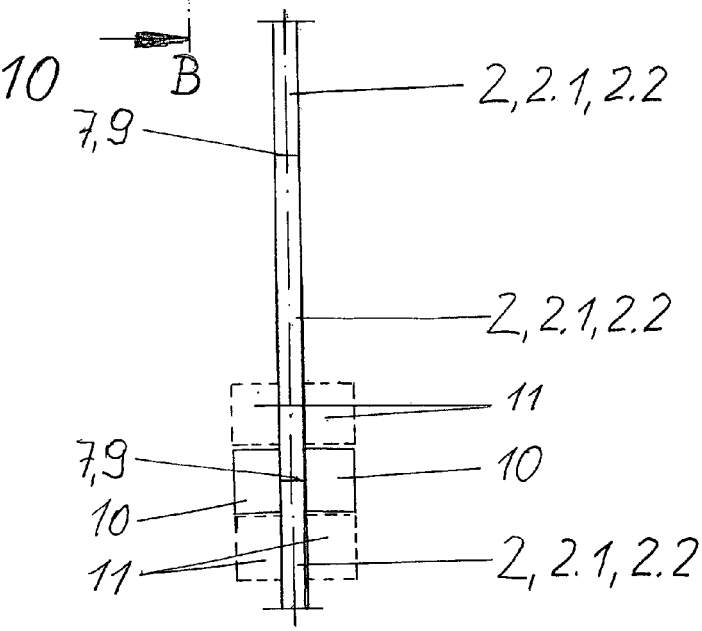
FIG. 10 is a cross sectional view taken along the line B-B of FIG. 9.

Following completion of this method step, the tube wall panels 2, 2.1, 2.2 are brought to the construction site for erection of the tube walls 1 of a steam generator, not shown, that is to be built. For that purpose, in the next step of the method the tube wall panels 2, 2.1, 2.2 are connected at the construction site, i.e., during assembly, at their circumferential weld-panel joints 7 by means of welded seams 9 (FIGS. 9, 10 and 12 show the connection of two tube wall panels 2, 2.1, 2.2). To apply the circumferential welds 9, in accordance with FIG. 12 the fins 4, 4.1 and the half-fins 5 are configured at the workshop somewhat shorter than the tubes 3, 3.1 so that a free space is created for completing the circumferential welds 9 on the tubes 3, 3.1. Following application of the circumferential welds 9, filler plates 27 are inserted into the free space and are connected by means of a welded seam 9.1 with the tubes 3, 3.1 and the fins 4, 4.1 and half-fins 5. If in place of the curved tube wall panel 2.1 corner bends 28 are used for forming the corners in inclined tubed tube walls 1, the corner bends 28 including their connecting fins 29 are now connected with the plane tube wall panels 2 by means of welded seams 9, 9.1.

Subsequent to this step of the method, the next step of the method takes place at the construction site, in which the welded seams 9, 9.1 are tempered by means of second heating devices 10 that is located in the region of the welded seams 9, 9.1, i.e., locally, and on both sides of the tube wall panels 2, 2.1, 2.2, see in this regard the lower region of FIGS. 9 and 10. The size of the tempering or annealing region and the individual tempering parameters, i.e., the thermal transfer region and the heating and cooling gradients, are determined in advance in accordance with the requirements. Depending on the constructive and geometric conditions, third heating devices 11 can be used additionally in the region adjacent to the second heating device 10 to supply auxiliary heat to reduce the temperature gradients and the stress that results from the temperature differential. In the case of the second as well as the third heating unit 10, 11, they can be geometrically adapted resistance annealing cassettes, which if necessary also cover and thus heat treat the region of the welded seam 23 after the closing of the assembly slots 18. The annealing region for heat treatment can extend over the entire width of the tube wall panel, or over defined regions of the panel width, or individual circumferential weld regions or individual assembly slot regions. As with the tempering treatment of the welded seams 8, 15, 21 and 25 in the workshop, the tempering treatment here is also advantageously carried out at a temperature of 740° to 780° C., and additionally advantageously over a time span of 2 minutes/mm of wall thickness, but at least for 60 minutes.

Figure 13:
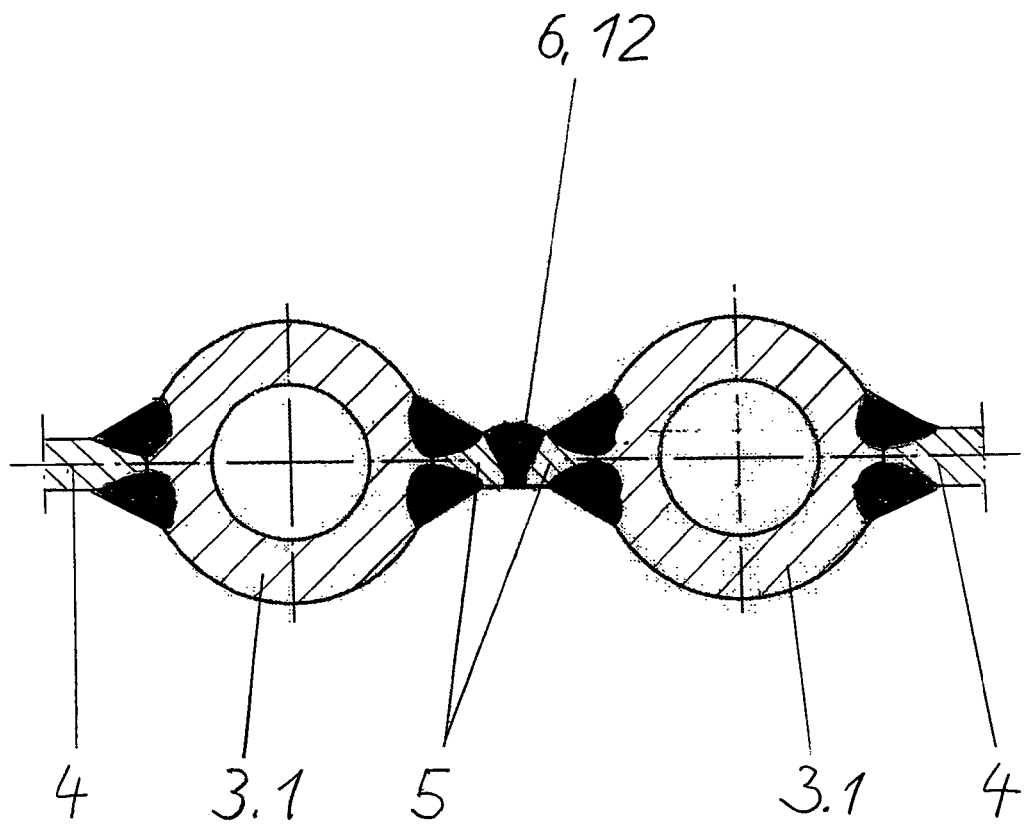
FIG. 13 is a cross sectional view taken along line C-C of FIG. 11.

Following the construction site tempering treatment of the welded seams 9, 9.1 and possibly 23, in the next step of the method the tube wall panels 2, 2.1, 2.2 (FIGS. 11 and 13 show the connecting of multiple tube wall panels 2, 2.1, 2.2) are connected into complete tube walls 1 at their fin-fin panel joints 6 by means of welded seams 12. As a result of the inventive design of the individual components of the tube wall panels 2, 2.1, 2.2, tempering treatment of the welded seams 12 is not necessary.

Following the assembling of the tube walls 1 at the assembly site, the tubes 14 of the tube coils, which are arranged inside the tube walls 1 and are not shown, can be passed through the take-up member, the sleeves 13 or filler plates 22, that are provided in the tube walls 1 and are connected with same by means of welding in accordance with FIG. 14 or 15. For that purpose, the prepared tube 14, which is made of a material that is not to be heat treated and which exhibits or is prepared with a sleeve 17 welded with the tube 14 in the region of the penetration of the tube wall 1, is inserted into the sleeve 13 or into the filler plate 22 so that the sleeve 13 or the filler plate 22 and the sleeve 17 form a connection location. Subsequently, the two sleeves 13 and 17 or the filler plate 22 and the sleeve 17 are connected at the assembly site by means of a welded seam 16. A subsequent tempering treatment of the welded seam 16 is not necessary because of the inventive implementation of the connection location.

In order to have the possibility of being able to weld the relevant needed components to the tube wall 1 of the steam generator at the construction site without having to perform a subsequent tempering treatment, suitable precautionary measures can be taken. For that purpose, the assembly welded connection locations, i.e., those locations at which other components are welded on at the construction site, consisting of weld-on parts, not shown, that are made primarily of 9-12% martensitic chromium steel, e.g., weld-on cheeks, are configured at the workshop with a plating made of a material that is not to be heat treated and/or a forged or rolled semifinished product made from a material that is not to be heat treated and/or from a buffering made of welding material that is not to be heat treated, and the weld-on parts are then welded to the tube wall panel 2, 2.1, 2.2 in the workshop and are subsequently tempered in the first heating device.

Figure 16:
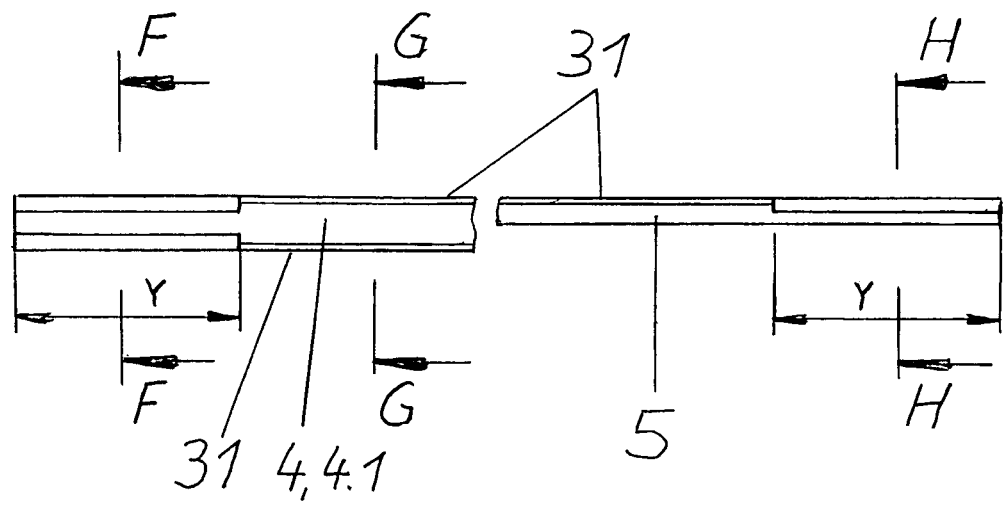
FIG. 16 is a schematic side view of the fin or the half-fin (for tube-fin connection)
Figures 17, 18:
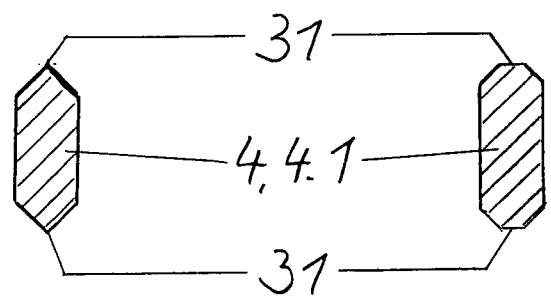
FIG. 17 is a cross sectional view taken along line F-F of FIG. 16.
FIG. 18 is a cross sectional view taken along line G-G of FIG. 16.
Figure 19:
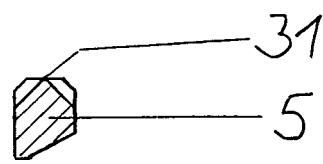
FIG. 19 is a cross sectional view taken along line H-H of FIG. 16.

In accordance with FIGS. 16 and 18, side surfaces 31 of the fins 4, 4.1 and half-fins 5 adjacent to the tubes are formed with natural rolled edges of up to 2 mm each (see FIG. 18). This serves to limit the residual gap of the welding between tube 3, 3.1 and fin 4, 4.1 or half-fin 5, and as a basis for the use of welding parameters that are optimized in terms of reduced welding stresses. In addition, in accordance with FIGS. 16, 17 and 19, the side surfaces 31 of the fins 4, 4.1 and half-fins 5 adjacent to the-tubes in the region of the local heat treatment of circumferential weld-panel joints 7 are configured with a chamfer for a double bevel groove weld so that in the workshop the tube-fin connection can take place as a complete connection. The region Y of the chamfer for a double bevel groove weld can be between 20 and 200 mm.

Preferably, the material X10CrWMoVNb9-2 (T92) is used for the tubes 3, 3.1, fins 4, half-fins 5, fittings 24 and filler plates 27 made of 9-12% martensitic chromium steel. As an alternative to that, the material VM12-SHC (in-house designation of the firm Vallourec-Mannesmann) is used. Alloy 617 (NiCr23Co12Mo) or alloy 617 mod. (NiCr23Co12Mo mod.) is preferably used for the components that are made of a material that is not to be heat treated for the tube wall panels 2, 2.1, 2.2. As an alternative to that, suitable heat-resisting austenitic materials can be used for the take-up member 13, 22 as well.

The filling welds in the region of the assembly site circumferential weld-panel joints 7 (welded seams 9.1) and the assembly slots 18 (welded seams 23) are preferably implemented using WIG methods.

To reduce stresses and distortions, the SAW welded connections of the tubes 3, 3.1 with the fins 4, 4.1 and half-fins 5 that are automated and performed in the workshop can be preheated.

In order to exclude the occurrence of cracks during the production and processing of the tube wall panels 2, 2.1, 2.2 in the workshop, intermediate annealing prior to completion with subsequent final heat treatment of the tube wall panels 2, 2.1, 2.2 can be carried out.

In order to relieve the annealing region of the tube wall panels 2, 2.1, 2.2 of forces during tempering treatment, a force deflection of its own weight can take place by means of hydraulic or mechanical auxiliary structures, depending on the particular application.

Preferably, a welding filler material of the same kind is used for welding to each other the tubes 3, 3.1, fins 4, half-fins 5, fittings 24 and filler plates 27 made of 9-12% martensitic chromium steels.

Preferably, a welding filler material of the same kind is used for welding to each other the tubes 3.1, fins 4.1, half-fins 5, sleeves 13, filler plates 22, corner bends 28, connecting fins 29 on corner bends 28, and bufferings 21 made of a material that is not to be heat treated.

Preferably, a welding filler material made of a material that is not to be heat treated is used for welding the tubes 3, 3.1, fins 4, half-fins 5, fittings 24 and filler plates 27 made of 9-12% martensitic chromium steels to the tubes 3.1 and/or fins 4.1 and/or half-fins 5 and/or sleeves 13 and/or filler plates 22 and/or corner bends 28 and/or connecting fins 29 on corner bends 28 and/or bufferings 21 made of a material that does not require a heat treatment.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for producing steam generator tube walls including 9-12% martensitic chromium steels; where the tube walls include at least one tube wall component selected from (a) corner bends including connecting fins and (b) tube wall panels including plane tube wall panels, curved tube wall panels, and transition tube wall panels, the tube wall panels including longitudinally extending tubes, fins and half-fins forming oppositely disposed outer edges, the longitudinally extending tubes, the fins and the half-fins each having a length, one half-fin being disposed at each of the outer edges, the longitudinally extending tubes of the tube wall panel disposed adjacent the outer edges defining one or more outermost tubes and other longitudinally extending tubes of the tube wall panel defining one or more middle tubes; the tube walls defining a penetration opening at a tube wall region at which one or more additional tubes are passed through the tube wall, one or more tube wall penetration openings being configured with a take-up member defining the one or more tube wall penetration openings, and the tube wall panels exhibit at periphery longitudinal fin-fin panel joints and transverse circumferential weld-panel joints; the method comprising the following steps:
    a) producing the plane tube wall panels, or the curved tube wall panels, or the transition tube wall panels, or the corner bends in a workshop, the plane tube walls, or the curved tube wall panels, or the transition tube wall panels being produced by connecting the longitudinally extending tubes, the fins and the half-fins with welded seams, and the take-up member with welded seams to the tube wall panels, and the corner bends being produced by connecting the corner bends with the connecting fins with welded seams,
    whereby the transition tube wall panel includes a first section having inclined tubes, a second section having vertical tubes and fittings disposed at a transition intermediate the first and second sections, the first section, the second section and the fittings being connected with a welded seam,
    whereby the corner bends are connected with the connecting fins with a welded seam,
    whereby the middle tubes and the fins are made of a 9-12% martensitic chromium steel, the outermost tubes on both sides of a tube wall panel are made of 9-12% martensitic chromium steel or of a material that is not to be heat treated, the half-fins are made of a material that is not to be heat treated or of a 9-12% martensitic chromium steel, a buffering applied on the half-fins is made of a material that does not require tempering, the take-up member are made of a material that is not to be heat treated, the corner bends with the connecting fins are made of a material that is not to be heat treated, and whereby the fittings are made of a 9-12% martensitic chromium steel or of a material that is not to be heat treated;
    b) tempering the welded seams of the produced tube wall panels in the workshop with a first heating device;
    c) connecting the plane tube wall panels, or the curved tube wall panels, or the transition tube wall panels, or the corner bends at their circumferential weld-panel joints by using filler plates with welded seams at an assembly site, whereby the filler plates are made of a 9-12% martensitic chromium steel;
    d) tempering the welded seams at the circumferential weld-panel joints of the tube wall panels or the corner bends at the assembly site with second heating devices located in a region adjacent the welded seams and on both sides of the tube wall panels;
    e) connecting the plane tube wall panels, or the curved tube wall panels, or the transition tube wall panels, or the corner bends at their half-fins or connecting fins at the assembly site with welded seams without a subsequent tempering of these welded seams; and
    f) passing the one or more additional tubes through the particular take-up member of the tube walls, each of the one or more additional tubes has a sleeve mounted thereon, whereby each sleeve is prepared from a material that is not to be heat treated, is arranged in the penetration region of the tube wall and is connected with the one or more additional tubes, and connecting of the sleeve with the take-up member at the assembly site with a welded seam without a subsequent tempering of these welded seams.

2. Method according to claim 1, wherein the corner bends are configured as single or double bends.

3. Method according to claim 1, wherein in addition to step a), at least one of the fins of the tube wall panel exhibits, over a partial region of its elongated extent and starting either from one end of the fin or from both ends of the fin, an assembly slot formed in the longitudinal direction of the fin for the compensation of dimensional inaccuracies, and that in the region of the assembly slot, the fin made of 9-12% martensitic chromium steel is replaced with a fin made of a material that does not have to be post-weld heat treated.

4. Method according to claim 3, wherein in addition to step c) of claim 1, the assembly slots are closed at the assembly site with welded seams following compensation of dimensional inaccuracies at the tube wall panels.

5. Method according to claim 4, wherein in addition to step d) of claim 1, tempering of the welded seams at the assembly slots of the tube wall panels takes place at the assembly site with second heating devices located in the region of the welded seams and on both sides of the tube wall panels.

6. Method according to claim 3, wherein the length of the fin corresponds to the length of the assembly slot plus an excess amount of 10 to 100 mm.

7. Method according to claim 1, wherein individual or all longitudinally extending tubes of a tube wall panel are configured at the circumferential weld-panel joint with a tube extension that is made of a material that is not to be heat treated.

8. Method according to claim 7, wherein the longitudinally extending tubes directly adjacent to an assembly slot are configured with the tube extension and the length of the tube extension corresponds to the length of the fin.

9. Method according to claim 1, wherein the take-up member is configured as the sleeve and the sleeve is arranged either within the fin or within two half-fins or within the filler plate and is welded to same.

10. Method according to claim 1, wherein in addition to step d), additional third heating devices are located in a region adjacent to the second heating devices which are located in the region adjacent the weld seams at the circumferential weld-panel joints of the tube wall panels or the corner bends and on both sides of the tube wall panels to generate auxiliary heat.

11. Method according to claim 1, wherein when the half-fin made of a 9-12% martensitic chromium steel is used, an adjacent tube is also made of 9-12% martensitic chromium steel.

12. Method according to claim 1, wherein during tempering of an annealing region of the tube wall panels having force deflection of its own weight, a hydraulic or mechanical auxiliary structure is used to relieve the force deflection.

13. Method according to claim 1, wherein the fins and the half-fins are configured at their side surfaces adjacent to the tubes with natural rolled edges of up to 2 mm each.

14. Method according to claim 1, wherein the fins and the half-fins have side surfaces adjacent to the tubes which are configured in the region of the circumferential weld-panel joints with a chamfer for a double bevel groove weld.

15. Method according to claim 1, wherein the welded seams configured as filling welds at the filler plates or at the assembly slots are produced with WIG welding.

16. Method according to claim 1, wherein prior to the workshop connecting of the fins and the half-fins with the tubes with a welded seam, these components are preheated and subsequently the welded seams between the tubes and the fins and the half fins are produced with a SAW welding method.

17. Method according to claim 1, wherein in addition to step a), during the course of the production of the tube wall panels, the tube wall panels or portions of the tube wall panels are intermediately annealed.

18. Method according to claim 1, wherein for welding on of components at the assembly site, suitable assembly weld connection locations of additional weld-on parts made primarily of 9-12% martensitic chromium steel are formed at the workshop with a plating made of a material that is not to be heat treated or a forged or rolled semifinished product made from a material that is not to be heat treated or from a buffering made of welding material that is not to be heat treated, and the weld-on parts are then welded to the tube wall panel in the workshop before they are subjected to step b).

19. Method according to claim 1, wherein a welding filler material of the same kind is used for welding to each other the longitudinally extending tubes, the fins, the half-fins, the fittings and the filler plates made of 9-12% martensitic chromium steels.

20. Method according to claim 1, wherein a welding filler material of the same kind is used for welding to each other the tubes, the fins, the half-fins, the sleeves, the filler plates, the corner bends, the connecting fins on the corner bends, and the bufferings made of a material that is not to be heat treated.

21. Method according to claim 1, wherein a welding filler material made of a material that does not require post-weld heat treatment is used for welding the tubes, or the fins, or the half-fins, or the fittings or the filler plates made of 9-12% martensitic chromium steels to the longitudinally extending tubes, or the fins, or the half-fins, or the sleeves, or the filler plates, or the corner bends, or the connecting fins on corner bends, or the bufferings made of a material that is not to be heat treated.

22. Method according to claim 1, wherein the 9-12% martensitic chromium steel is X10CrWMoVNb9-2 material

23. Method according to claim 1, wherein the material that is not to be heat treated is NiCr23Co12Mo mod or NiCr23Co12Mo material.

24. Method according to claim 1, wherein according to step a), the half-fins and the outermost tubes for the production of the curved tube wall panels are made of a material that is not to be heat treated.

25. Method according to claim 1, wherein the plane tube wall panels and the curved tube wall panels or the plane tube wall panels and the corner bends are used for production of inclined tubed tube walls.

26. Method according to claim 1, wherein the plane tube wall panels are used for production of vertically tubed tube walls.

27. Method according to claim 1, wherein the plane tube wall panels, the curved tube wall panels and the transition wall panels or the plane tube wall panels, the transition tube wall panels and the corner bends are used for production of inclined and vertically tubed tube walls.

28. Method according to claim 1, wherein the tempering takes place at a temperature of 740 to 780° C.

29. Method according to claim 1, wherein the tempering takes place over a time span of 2 minutes/mm of wall thickness, but at least for 60 minutes.

30. A method for producing steam generator tube walls including 9-12% martensitic chromium steels; where the tube walls include corner bends and tube wall panels selected from plane tube wall panels, curved tube wall panels, and transition tube wall panels, the tube wall panels including longitudinally extending tubes, fins and half-fins forming oppositely disposed outer edges, the longitudinally extending tubes, the fins and the half-fins each having a length, the half-fin being disposed at outer edges, the longitudinally extending tubes of the tube wall panel disposed adjacent the outer edges defining one or more outermost tubes and other of the longitudinally extending tubes of the tube wall panel defining one or more middle tubes; the tube walls defining a penetration opening at a tube wall region at which one or more additional tubes are passed through the tube wall, one or more tube wall penetration openings being configured with a take-up member defining the one or more tube wall penetration openings, and the tube wall panels exhibit at periphery longitudinal fin-fin panel joints and transverse circumferential weld-panel joints; the method comprising the following steps:

a) producing the plane tube wall panels, or the curved tube wall panels, or the transition tube wall panels, or the corner bends in a workshop, the plane tube walls, or the curved tube wall panels, or the transition tube wall panels being produced by connecting the longitudinally extending tubes, the fins and the half-fins with welded seams, and the take-up member with welded seams to the tube wall panels, and the corner bends being produced by connecting the corner bends with the connecting fins with welded seams, whereby the transition tube wall panel includes a first section having inclined tubes, a second section having vertical tubes and fittings disposed at a transition intermediate the first and second sections, the first section, the second section and the fittings being connected with a welded seam, whereby the corner bends are connected with the connecting fins with a welded seam, whereby the middle tubes and the fins are made of a 9-12% martensitic chromium steel, the outermost tubes on both sides of the tube wall panel are made of 9-12% martensitic chromium steel or of a material that is not to be heat treated, the half-fins are made of a material that is not to be heat treated or of a 9-12% martensitic chromium steel, a buffering applied on the half-fins is made of a material that does not require tempering, the take-up member are made of a material that is not to be heat treated, the corner bends with the connecting fins are made of a material that is not to be heat treated, and whereby the fittings are made of a 9-12% martensitic chromium steel or of a material that is not to be heat treated;

b) tempering the welded seams of the produced tube wall panels in the workshop with a first heating device;

c) connecting of the plane tube wall panels, or the curved tube wall panels, or the transition tube wall panels, or the corner bends at their circumferential weld-panel joints by using filler plates with welded seams at an assembly site, whereby the filler plates are made of a 9-12% martensitic chromium steel;

d) tempering the welded seams at the circumferential weld-panel joints of the tube wall panels or the corner bends at the assembly site with second heating devices located in a region adjacent the welded seams and on both sides of the tube wall panels;

e) connecting the plane tube wall panels, or the curved tube wall panels, or the transition tube wall panels corner bends at the half-fins or the connecting fins at the assembly site with welded seams without a subsequent tempering of these welded seams; and f) passing the one or more additional tube through the particular take-up member of the tube walls, each of the at least one additional tubes has a sleeve mounted thereon, whereby each sleeve is prepared from a material that is not to be heat treated, is arranged in the penetration region of the tube wall and is connected with the tube, and connecting of the sleeve with the take-up member at the assembly site with a welded seam without a subsequent tempering of these welded seams.

31. A method for producing steam generator tube walls including 9-12% martensitic chromium steels; where the tube walls include tube wall panels selected from plane tube wall panels, curved tube wall panels, and transition tube wall panels, the tube wall panels including longitudinally extending tubes, fins and half-fins forming oppositely disposed outer edges, the longitudinally extending tubes, the fins and the half-fins each having a length, a half-fin being disposed at each outer edge, the longitudinally extending tubes of the tube wall panel disposed adjacent the outer edges defining one or more outermost tubes and other longitudinally extending tubes of the tube wall panel defining one or more middle tubes; the tube walls defining a penetration opening at a tube wall region at which one or more additional tubes are passed through the tube wall, one or more tube wall penetration openings being configured with a take-up member defining the one or more tube wall penetration openings, and the tube wall panels exhibit at periphery longitudinal fin-fin panel joints and transverse circumferential weld-panel joints; the method comprising the following steps:

a) producing the plane tube wall panels, or the curved tube wall panels, or the transition tube wall panels in a workshop, the plane tube walls, or the curved tube wall panels, or the transition tube wall panels being produced by connecting the longitudinally extending tubes, the fins and the half-fins with welded seams, and the take-up member with welded seams to the tube wall panels, whereby the transition tube wall panel includes a first section having inclined tubes, a second section having vertical tubes and fittings disposed at a transition intermediate the first and second sections, the first section, the second section and the fittings being connected with a welded seam, whereby the middle tubes and the fins are made of a 9-12% martensitic chromium steel, the outermost tubes on both sides of the tube wall panel are made of 9-12% martensitic chromium steel or of a material that is not to be heat treated, the half-fins are made of a material that is not to be heat treated or of a 9-12% martensitic chromium steel, a buffering applied on the half-fins is made of a material that does not require tempering, the take-up member are made of a material that is not to be heat treated, and whereby the fittings are made of a 9-12% martensitic chromium steel or of a material that is not to be heat treated;

b) tempering the welded seams of the produced tube wall panels in the workshop with a first heating device;

c) connecting of the plane tube wall panels, or the curved tube wall panels, or the transition tube wall panels at their circumferential weld-panel joints by using filler plates with welded seams at an assembly site, whereby the filler plates are made of a 9-12% martensitic chromium steel;

d) tempering the welded seams at the circumferential weld-panel joints of the tube wall panels at the assembly site with second heating devices located in a region adjacent the welded seams and on both sides of the tube wall panels;

e) connecting the plane tube wall panels, or the curved tube wall panels, or the transition tube wall panels at their half-fins at the assembly site with welded seams without a subsequent tempering of these welded seams; and f) passing the one or more additional tubes through the particular take-up member of the tube walls, each of the one or more additional tubes has a sleeve mounted thereon, whereby each sleeve is prepared from a material that is not to be heat treated, is arranged in the penetration region of the tube wall and is connected with the tube, and connecting of the sleeve with the take-up member at the assembly site with a welded seam without a subsequent tempering of these welded seams.

32. A method for producing steam generator tube walls including 9-12% martensitic chromium steels; where the tube walls include tube wall panels selected from plane tube wall panels, curved tube wall panels, and transition tube wall panels, the tube walls defining a penetration opening at a tube wall region at which one or more additional tubes are passed through the tube wall, one or more tube wall penetration openings being configured with a take-up member defining the one or more tube wall penetration openings, and the tube wall panels exhibit at periphery longitudinal fin-fin panel joints and transverse circumferential weld-panel joints; the method comprising the following steps:

a) producing the plane tube wall panels, or the curved tube wall panels, or the transition tube wall panels in a workshop, the plane tube walls, or the curved tube wall panels, or the transition tube wall panels being produced by connecting the longitudinally extending tubes, the fins and the half-fins with welded seams, and the take-up member with welded seams to the tube wall panels;

b) tempering the welded seams of the produced tube wall panels in the workshop with a first heating device;

c) connecting of the plane tube wall panels, or the curved tube wall panels, or the transition tube wall panels at their circumferential weld-panel joints by using filler plates with welded seams at an assembly site, whereby the filler plates are made of a 9-12% martensitic chromium steel;

d) tempering the welded seams at the circumferential weld-panel joints of the tube wall panels at the assembly site with second heating devices located in a region adjacent the welded seams and on both sides of the tube wall panels;

e) connecting the plane tube wall panels, or the curved tube wall panels, or the transition tube wall panels at their half-fins at the assembly site with welded seams without a subsequent tempering of these welded seams; and f) passing the one or more additional tubes through the particular take-up member of the tube walls, each of the one or more additional tubes has a sleeve mounted thereon, whereby each sleeve is prepared from a material that is not to be heat treated, is arranged in the penetration region of the tube wall and is connected with the tube, and connecting of the sleeve with the take-up member at the assembly site with a welded seam without a subsequent tempering of these welded seams.

* * * * *